United States Patent [19]

Christiansen

[11] 4,239,597
[45] Dec. 16, 1980

[54] NUCLEAR FUEL SPACER GRID

[75] Inventor: David W. Christiansen, Kennewick, Wash.

[73] Assignee: The Babcock & Wilcox Company, New Orleans, La.

[21] Appl. No.: 891,792

[22] Filed: Mar. 30, 1978

[51] Int. Cl.² .............................................. G21C 3/30
[52] U.S. Cl. .......................................... 176/78; 176/76
[58] Field of Search ...................... 176/78, 76, 75, 87

[56] References Cited

U.S. PATENT DOCUMENTS

| 3,791,466 | 2/1974 | Patterson | 176/78 |
|---|---|---|---|
| 3,804,354 | 4/1974 | Weiss | 176/78 |
| 3,920,516 | 11/1975 | Kmonk | 176/78 |
| 3,984,284 | 10/1976 | Long | 176/78 |
| 4,119,490 | 10/1978 | Delafosse | 176/76 |
| 4,120,751 | 10/1978 | Bezold | 176/78 |
| 4,124,443 | 11/1978 | Bezold | 176/76 |

Primary Examiner—Donald P. Walsh
Attorney, Agent, or Firm—Robert J. Edwards; Robert H. Kelly; Angelo Notaro

[57] ABSTRACT

A typical embodiment of the invention provides structural support for the grids in a nuclear reactor fuel assembly. Illustratively, the external surfaces of water rods or instrument tubes in a fuel assembly are provided with annular recesses. A spacer grid retainer is engaged within the recesses by means of spring loaded fingers on the retainer, in which the spring loading forces are greater than anticipated vibration forces to reduce fretting corrosion. Notches formed in the retainer secure the grid to the retainer, all in a manner that simplifies fuel assembly construction and restricts grid movement at lower cost.

5 Claims, 4 Drawing Figures

NUCLEAR FUEL SPACER GRID

BACKGROUND OF THE DISCLOSURE

1. Field of the Invention

This invention relates to fuel assemblies for nuclear reactors and, more particularly, to retainers for joining fuel element grids to water rods or instrument tubes, and the like.

SUMMARY OF THE PRIOR ART

To produce power from a nuclear reactor, it is necessary to assemble a concentration of fissionable uranium in a quantity and in a physical configuration capable of sustaining a continuous sequence of fission reactions. This concentration frequently is referred to as the reactor core. The heat that these fission reactions generate is transferred for example, to pressurized water which, in turn, transfers its heat to a secondary coolant—usually water—which rises into steam. This steam, of course, drives the turbines which power the electrical generation equipment.

Because the radiation, pressure, temperature flow velocity and other environmental conditions within the reactor core are quite hostile, the reactor core must be of sturdy construction. These conditions produce a number of phenomena with which it is very difficult to cope. Thus, for example, thermal effects tend to produce considerable expansion and contraction among the fuel assembly components, the high water flow velocities tend to induce vibration and the radiation often has the effect of inducing a certain amount of "growth" or size increase in metals within the reactor core. These effects have been known to produce a type of deterioration in the materials at the junction of two or more components that is known as "fretting".

In contrast with this need for sturdy fuel assembly construction, however, there is a countervailing requirement for the reactor core to be subject to thorough inspection, adaptable to swift assembly and disassembly, and to contain a minimum mass of neutron absorbing parasitical materials that do not contribute directly to the fission process.

These conflicting requirements have been reconciled to a great extent by loading pellets of uranium dioxide into long, slender tubes. With a full load of pellets and the ends of each of the rods sealed, these fuel rods are arranged longitudinally parallel with each other and are organized in generally rectangular arrays each of about two hundred fuel rods. These groups of fuel rods, or fuel assemblies, all are mounted side-by-side in a larger, generally right circular cylindrical configuration that characterizes the reactor core.

The fuel assemblies often comprise a pair of end fittings that are disposed in a direction that is generally transverse to the longitudinal axes of the fuel rods. The fuel rods, in-turn are engaged between the end fittings. At intervals along the length of the assembled rods, transversely disposed cellular grids are in contact with the outer fuel rod surfaces in order to brace the fuel rods, dampen vibration and to enhance the structural integrity of the reactor core.

There are, moreover, a number of other rods, tubes and the like which are included in the fuel assembly structure to accommodate reactor core instruments, control rods for regulating the power generated within the core and for other purposes. These tubes also are received within and pass through the cells of the transversely disposed grids. Naturally, in some grid designs, the points of contact between the grid and the fuel rods and tubes that are lodged in the grid are loci for this undersirable "fretting" phenomenon.

There is, of course, a further need for precision in locating the components during fuel element erection. That is, the position of the individual grids relative to each other and to the balance of the fuel assembly structure must be accurately established.

SUMMARY OF THE INVENTION

These and other difficulties that have characterized the prior art are overcome, to a large extent, through the practice of the invention. More specifically, water rods, instrument tubes and the like are provided with annular recesses on their respective external surfaces at longitudinal stations which correspond to the desired relative transverse positions of the grids.

Spacer grid retainers are attached to these rods and tubes, as appropriate, by means of preloaded resilient fingers. These fingers protrude into the respective annular recesses on the tubes and rods. The fingers bear against the recessed surfaces in order to fix the spacer grid retainer position at the particular longitudinal rod stations. In accordance with a salient feature of the invention, moreover, the fingers on the individual spacer grid retainers are sufficiently preloaded to clutch the annular surface of the adjacent rod with force that is greater than the anticipated vibration loads at these points of contact within the fuel assembly structure. This specific technique stabilizes the contact points and overcomes vibration induced relative motion between the contacting parts, thereby eliminating a major source of fretting reduction. This structure further establishes definite grid locations relative to the tubes or rods during fuel assembly construction or dismounting, thereby eliminating a number of costly fixtures and time consuming alignment procedures. The grid retainer finger and recess combination affords an even further advantage in that it limits relative "travel" of the component parts that otherwise might result from unimpeded radiation—induced "growth".

Consequently, the practice of the invention overcomes a number of difficulties that have beset the prior art.

DETAILED DESCRIPTION OF THE PREFERRED EMBODIMENTS

Figure 2:
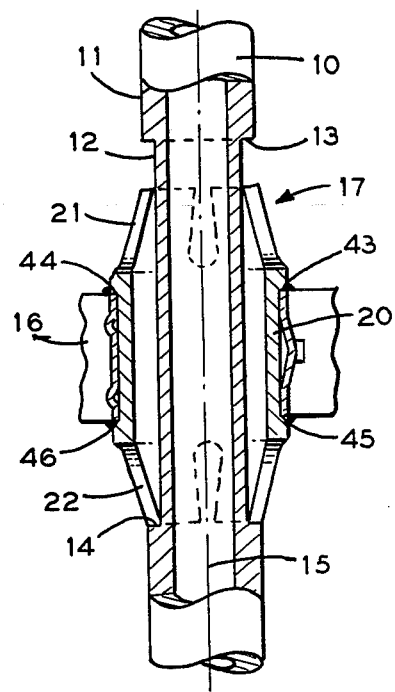
FIG. 2 is a full section of the embodiment of the invention that is shown in FIG. 1.

For a more complete appreciation of the invention, attention is invited to FIG. 2 which shows an instrument tube or water rod 10 that has an external surface 11 in which an annular recess 12 has been formed. The annular recess 12 has flanges 13, 14 that are spaced from each other to provide stops, and described subsequently in more complete detail. These flanges 13, 14 are disposed in parallel planes that are generally transverse to longitudinal axis 15 of the rod 10. The spacing between the flanges 13, 14 moreover, is significantly greater than longitudinal depth of fuel element spacer grid 16 that is to be mounted on the rod 10. Care must be taken, of course, to balance the depth of the recess 12 for the purpose of providing stops against the required structural integrity of the rod 11.

Figure 1:
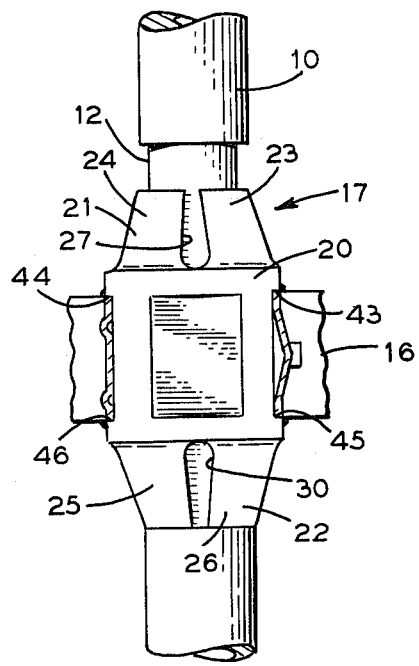
FIG. 1 is a front elevation of a typical embodiment of the invention.

In accordance with a feature of the invention, a hollow, generally cylindrical spacer grid retainer 17 is engaged by means of the recess 12. As illustrated in FIG. 1, the spacer grid retainer 17 has a tubular central portion 20. The inside diameter of the tubular central portion 20, as best shown in FIG. 2 is about twice the diameter of the recess 12.

Two sets of resilient biased fingers 21, 22 are formed on the opposite transverse edges of the central portion 20. These sets of fingers 21, 22 protrude inwardly toward the longitudinal axis 15 of the rod 10 a sufficient distance to bear against the recessed surface of the rod 11 with enough force to prevent relative movement between the retainer 17 and the associated rod 10 that might be induced through vibration, seismic impact, or other forces of both routine and unusual natures.

Turning once more to FIG. 1, individual fingers 23, 24 and 25, 26 on the sets of fingers 21, 22, respectively are separated by means of slots 27, 30. It should be noted that the widths of the respective slots 27, 30 are greatest adjacent to the tubular central portion 20. The width of these slots, however, taper to respective narrow gaps of minimum width at the ends of the pairs of fingers 23, 24 and 25, 26. This particular feature of applicant's invention facilitates the assembly of the spacer grid retainer 17 on the rod 10.

Figure 4:
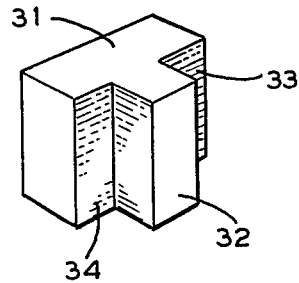
FIG. 4 is a perspective view of a typical locking block for use in connection with the invention in the manner indicated in FIG. 3.

As shown, for example, in FIG. 4 locking block 31 is formed in the shape of an inverted "Tee". A land, or central shank 32 protrudes above grooves 33, 34 that are formed in the body of the block 31. The protrusion of the land 32 above the grooves 33, 34 through a distance that is equal to the thickness of the material from which the spacer grid 17 is formed. In width, the land 32 is almost equal to the maximum width of the slots 27, 30 (FIG. 1) that are formed between the fingers 23, 24 and 25, 26, respectively.

In operation (FIG. 3) the locking block 31 and a locking block 35 are pressed into respective slots 36, 37. The uniform width of the lands in each of these blocks, being equal to the maximum slot width, causes the inwardly protruding fingers on each side of the respective slots to spread apart and to straighten up into alignment with the tubular central portion 20 of the retainer 17. This movement of the fingers 40, 41 and 42 accommodates the slot width to the width of the lands on the locking blocks 31, 35. By temporarily compelling the finger to bend into alignment with the tubular central portion 20 of the spacer grid retainer 17, the transverse diameter of these fingers is effectively increased to a size that is greater than the outside diameter of the water rod 10 (FIG. 2). Accordingly, the spacer grid retainer 17 can be slipped over the water rod 10 until it is in position over the predetermined annular recess 12. The illustrative locking blocks 31, 35 (FIG. 3) are removed from the respective slots 36, 37 to permit the adjacent sets of fingers to snap inwardly into engagement with the outer surface of the annular recess as illustrated in FIGS. 1 and 2.

Figure 3:
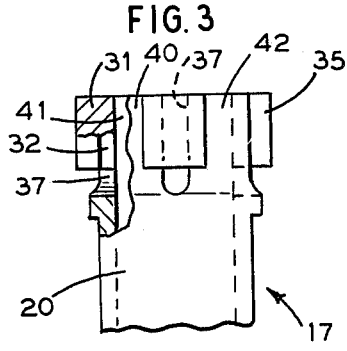
FIG. 3 is a portion of a retainer in accordance with principles of the invention, prepared for mounting on a tube.

Although FIG. 3 shows only the two locking blocks 31, 35 in temporary position for the purpose of simplified description, preferably, four blocks would be used, one block for each of the four slots that form the four fingers on the particular end of the spacer grid retainer 17.

As shown in FIGS. 1 and 2, the fuel element spacer grid 16 is welded, or otherwise secured, within protruding, longitudinally spaced detents 43, 44, 45, 46 that are formed on the outer surface of the tubular central portion 20 of the spacer grid retainer 17. As a practical matter, the spacer grid retainer 17 (as well as other similar retainers, not shown in the drawing) should be mounted in its appropriate fuel element spacer grid cell and welded, or otherwise fastened in position. A typical spacer grid assembly suitable for application in connection with this feature of the invention is illustrated in Felix S. Jabsen U.S. Pat. No. 3,655,586 issued May 30, 1972 and U.S. Pat. No. 3,795,040 issued Mar. 5, 1974.

Thus, there is provided in accordance with the invention, a technique for mounting fuel element spacer grids on water rods, control rod housings, water tubes, instrument rods, or other suitable supports in a manner that prevents relative movement between the grid and the support. This improvement overcomes the fretting corrosion damage that has characterized the prior art, while nevertheless permitting thermal expansion and contraction as well as structural growth induced through nuclear effects.

I claim:

1. In a nuclear fuel assembly structure of the type having a plurality of fuel elements transversely separated by a fuel element spacer grid, the improvement comprising a tubular structural support for the fuel assembly, the tubular structural support having a longitudinal axis, a smooth outer surface free from protuberances, and a recessed intermediate surface formed in a portion of the outer surface of the tubular structural support, the recessed intermediate surface having longitudinally spaced flanges, said flanges connecting the smooth outer surface to the recessed intermediate surface, a spacer grid retainer generally enclosing at least a portion of the recessed intermediate surface between the longitudinally spaced flanges, said spacer grid retainer having a plurality of detents thereupon for engaging said spacer grid, and a plurality of resilient slotted fingers on the spacer grid retainer, the fingers protruding from the retainer into the recessed intermediate surface formed in the smooth outer surface of the tubular structural support in order to bear against the recessed intermediate surface and to selectively engage the flanges, said spacer grid retainer being secured at a predetermined position relative to the tubular structural support determined by the engagement of the fingers with the recessed intermediate surface of the tubular support structure.

2. The fuel assembly structure defined in claim 1, wherein the spacer grid retainer includes a tubular central portion spaced from said recessed intermediate surface and the resilient slotted fingers extend from the end edges of the tubular central portion.

3. The fuel assembly structure defined in claim 2, wherein the recessed intermediate surface has an annular cross section and the tubular central portion has a diameter dimension generally twice the diameter of the recessed intermediate surface of the tubular structural support.

4. The fuel assembly structure defined in claim 1 or 2 wherein the resilient slotted fingers are separated by means of tapered slots.

5. The fuel assembly structure defined in claim 4, wherein the narrowest dimension of the tapered slots is disposed adjacent the ends of the fingers.

* * * * *